May 26, 1964    F. W. BRUNKHARDT ETAL    3,134,227
INJECTOR NOZZLE FOR ROCKET PROPELLANTS
Filed June 24, 1959
FIG_1
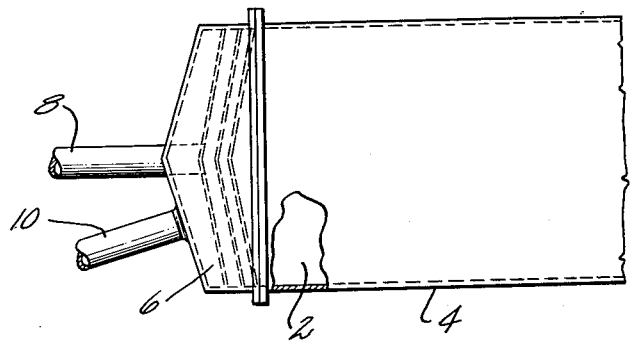
FIG.2
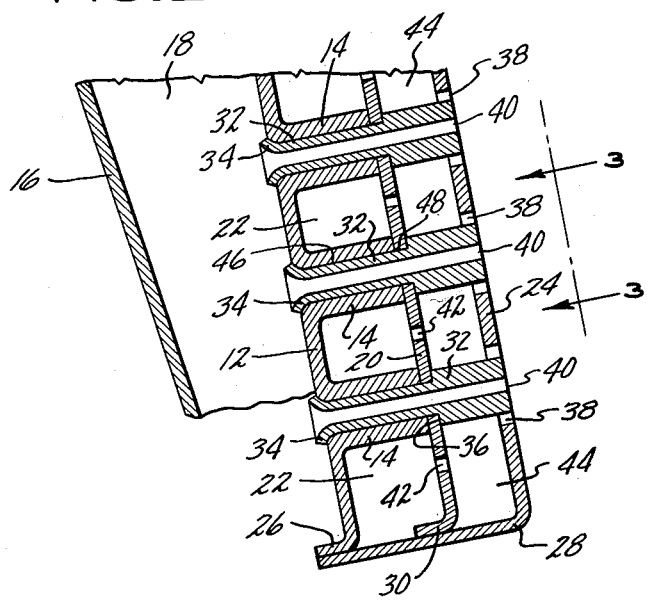
FIG.3
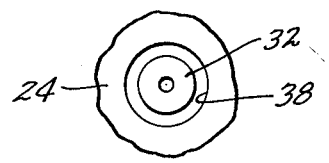
FIG_4
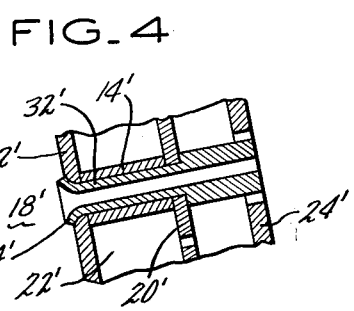
INVENTORS
FREDERICK W. BRUNKHARDT
NORMAN E. WHITNEY
BY  *Leslie A. Warner*
ATTORNEY

United States Patent Office 3,134,227
Patented May 26, 1964

3,134,227
INJECTOR NOZZLE FOR ROCKET PROPELLANTS
Frederick W. Brunkhardt, South Glastonbury, and Norman E. Whitney, Windsor Locks, Conn., assignors to United Aircraft Corporation, East Hartford, Conn., a corporation of Delaware
Filed June 24, 1959, Ser. No. 822,465
6 Claims. (Cl. 60—39.46)

This invention relates to an injector head particularly adapted for supplying fluid propellants to a rocket chamber.

One feature of the invention is an injector head which can be machined after partial assembly to assure alignment of the several parts. Another feature is an injector head that requires a minimum of precision machining during manufacture.

Another feature of the invention is a method for producing an injector head of this character.

Other features and advantages will be apparent from the specification and claims, and from the accompanying drawing which illustrates an embodiment of the invention.

FIG. 1 is a side elevation of a portion of a rocket with parts broken away.

FIG. 2 is a sectional view on a larger scale of a portion of the injector head.

FIG. 3 is a view of one of the nozzle assemblies looking in the direction of the line 3—3 of FIG. 2.

FIG. 4 is a sectional view similar to FIG. 2 of a modification.

The invention is shown in a rocket having a main combustion chamber 2 defined by side walls 4 and an end cap or injector head 6, the propellants being supplied to the injector head through conduits 8 and 10, respectively.

In accordance with the invention, the injector head is made up of a plate 12 having a plurality of projecting studs or bosses 14 on one side thereof. On the side of the plate 12 opposite to the studs 14 is a cap 16 defining a propellant chamber 18. On the same side of the plate 12 as the studs 14 is a second plate 20 defining between it and the first plate a chamber 22 for the other propellant. The chamber 18 is preferably supplied by the conduit 10 and the chamber 22 by the conduit 8, as will be apparent.

Also forming a part of the injector head and supported in spaced relation to the plate 20 is the injector plate 24 through which the propellants are delivered to the main combustion chamber 2. The plates 12 and 24 may be suitably held in fixed spaced relation to each other as by annular flanges 26 and 28, respectively, which flanges may be brazed or otherwise attached one to the other and to a peripheral flange 30 on plate 20.

The projections 14 are hollow and each receives a tube 32, the inner or upstream end of each tube being flared as at 34 to retain the tube in position within the associated projection. The tube has a shoulder 36 which engages with the surface of the plate 20 so that the plate 20 is held against the ends of the projections 14. The shoulder also serves to support the tube 32 axially in the desired position with respect to the plate 12.

Downstream of the shoulder 36 the tube is larger in diameter and terminates at a point substantially in the same plane as the outer or downstream surface of the plate 24. Each tube 32 at its lower end fits within an annular opening 38 in the plate 24 thereby defining an annular nozzle surrounding the nozzle 40 defined by the downstream end of the tube. Propellant from the chamber 18 is thus discharged through the tube and nozzle 40. Propellant from the chamber 22 flows through openings 42 in the plate 20 into a cooling chamber 44 between the plates 20 and 24 and thence through the annular nozzles 38 into the main combustion chamber. The propellant in chamber 44 is effective to cool the plate 24 which is exposed to the heat in the main combustion chamber. An additional function of chamber 44 is to provide a location conducive to conversion of any propellant remaining in the liquid state to the form of vapor. This will provide a more effective distribution of propellant on discharge through 38 into 2.

In the manufacture of this injector head it has been found that the necessary machining required for having the various passages and openings in accurate relation to each other may be minimized by assembling the plates 12, 20 and 24 in the relation shown after the openings 42 have been machined but with the plates 20 and 24 otherwise imperforate and with the projections 14 similarly imperforate. After these three plates are in assembled relation, a bore 46 in each projection, an opening 48 in the plate 20 in alignment with the bore 46 and the opening 38 in line with the bore 46 and the opening 48 may all be machined simultaneously so that these several openings will be in the necessary alignment to permit assembly of the tubes 32 with the required precision fit.

It will be apparent that although the spacing of the bores 46 in adjacent projections 14 is not critical, it would be necessary, if they were formed prior to the assembly of the parts, for these bores to be machined in precise relationship to one another if these bores were to be in alignment with the openings 48. Accordingly, the outlined method permits the construction and assembly of the injector head with a minimum of precision machining.

After the several tube receiving openings have been drilled or otherwise machined, the individual tubes are inserted and the upstream ends of the tubes are expanded as at 34 to retain the parts in assembled relation. To effectively separate the individual propellants prior to final mixture in the combustion chamber, the space between bore 46 in projection 14 and the upstream end of tube 32 may be made fluid tight at the flared end 34 by brazing, welding or other effective means.

The assembly may be further simplified by making the bosses or projections 14 as separate elements as in FIG. 4 where the sleeves 14' correspond to the bosses 14 and are held in position by the tubes 32'. With this arrangement, the plates 12', 20' and 24' require only simple drilling operations. Leakage between chambers 18' and 22' may be prevented by brazing or welding around the expanded end 34' of the tube 32'.

It is to be understood that the invention is not limited to the specific embodiment herein illustrated and described, but may be used in other ways without departure from its spirit as defined by the following claims.

We claim:
1. In an injector head, a first plate having a plurality of tubular projections on one side thereof, a second plate spaced from said first plate on said one side thereof and with said first plate forming the top and bottom walls of a first propellant chamber, said second plate seating on the ends of said projections and having openings in alignment with passages in said projections, a cap on the other side of said first plate forming with the latter a second propellant chamber, an injector plate on that side of said second plate remote from said first plate and spaced from said second plate, a peripheral member overlying the margins of said first and second plates and secured thereto to hold said plates in spaced relation and complete said first propellant chamber, said injector plate having passages aligned with said projections, a nozzle tube extended through and having a close fit in the passage in each of said projections and extended through the aligned openings in said second plate and terminating at one of its ends in said second propellant chamber and having its other end positioned in and spaced from one of said injector plate passages to form an annular nozzle, said second plate having propellant passages communicating with said first propellant chamber.

2. An injector head as in claim 1 wherein each nozzle tube has a shoulder limiting the axial movement of the tube within its tubular projection.

3. An injector head as in claim 2 wherein said shoulders on the nozzle tubes hold said second plate against the ends of said projections.

4. An injector head as in claim 3 wherein the ends of said nozzle tubes in said second propellant chamber are expanded to retain said tubes and said second plate in position.

5. An injector head as in claim 1 in which said injector plate carries the peripheral member to which the margins of said first and second plates are connected.

6. An injector head as in claim 1 in which the propellant passages provided in said second plate are out of alignment with said projections for admitting propellant from said first propellant chamber to the space between said second plate and said injector plate and in which the passages in said injector plate which are larger than the ends of said nozzle tubes positioned therein provide a propellant nozzle concentric with said nozzle tube.

References Cited in the file of this patent

UNITED STATES PATENTS

| | | |
|---|---|---|
| 2,405,785 | Goddard | Aug. 13, 1946 |
| 2,470,564 | Lawrence | May 17, 1949 |
| 2,540,665 | Goddard | Feb. 6, 1951 |
| 2,733,570 | Macpherson | Feb. 7, 1956 |
| 2,753,687 | Wissley et al. | July 10, 1956 |
| 2,754,656 | Munger | July 17, 1956 |
| 2,765,525 | O'Neill | Oct. 9, 1956 |
| 2,869,228 | Martin | Jan. 20, 1959 |
| 3,000,184 | Fish | Sept. 19, 1961 |
| 3,073,122 | Ledwith | Jan. 15, 1963 |

FOREIGN PATENTS

| | | |
|---|---|---|
| 731,739 | Great Britain | June 15, 1955 |